(12) United States Patent
Byrne et al.

(10) Patent No.: US 10,720,795 B2
(45) Date of Patent: Jul. 21, 2020

(54) WORKSURFACE-MOUNTED WIRELESS CHARGING GROMMET

(71) Applicants: Norman R. Byrne, Ada, MI (US); Peter J. Maher, Grand Rapids, MI (US)

(72) Inventors: Norman R. Byrne, Ada, MI (US); Peter J. Maher, Grand Rapids, MI (US)

(*) Notice: Subject to any disclaimer, the term of this patent is extended or adjusted under 35 U.S.C. 154(b) by 496 days.

(21) Appl. No.: 15/583,379

(22) Filed: May 1, 2017

(65) Prior Publication Data

US 2017/0317533 A1 Nov. 2, 2017

Related U.S. Application Data

(60) Provisional application No. 62/330,831, filed on May 2, 2016.

(51) Int. Cl.
*H02J 50/12* (2016.01)
*H02J 50/40* (2016.01)
*H01R 27/02* (2006.01)
*H02J 7/02* (2016.01)
*H02J 50/05* (2016.01)
*H04B 5/00* (2006.01)

(52) U.S. Cl.
CPC .............. *H02J 50/12* (2016.02); *H01R 27/02* (2013.01); *H02J 7/025* (2013.01); *H02J 50/05* (2016.02); *H02J 50/40* (2016.02); *H04B 5/0037* (2013.01); *H04B 5/0012* (2013.01); *H04B 5/0075* (2013.01)

(58) Field of Classification Search
CPC .. H02J 50/12; H02J 50/05; H02J 7/025; H02J 50/40; H04B 5/0037; H04B 5/0075; H04B 5/0012; H01R 27/02
See application file for complete search history.

(56) References Cited

U.S. PATENT DOCUMENTS

| | | | |
|---|---|---|---|
| 8,061,864 B2 * | 11/2011 | Metcalf | A47B 21/00 362/127 |
| 8,262,244 B2 | 9/2012 | Metcalf et al. | |
| 8,421,407 B2 * | 4/2013 | Johnson | H02J 7/0044 320/108 |
| 8,558,411 B2 | 10/2013 | Baarman et al. | |
| 8,951,054 B2 | 2/2015 | Byrne et al. | |
| 9,438,070 B2 | 9/2016 | Byrne et al. | |
| 9,484,751 B2 | 11/2016 | Byrne et al. | |
| 9,601,860 B2 | 3/2017 | Byrne et al. | |

(Continued)

*Primary Examiner* — Jared Fureman
*Assistant Examiner* — Michael J Warmflash
(74) *Attorney, Agent, or Firm* — Gardner, Linn, Burkhart & Ondersma LLP

(57) ABSTRACT

An electrical power unit is positionable at a work surface and includes an upper housing including an upper surface and a lower surface spaced below the upper surface to define an upper housing chamber. A wireless power transmitter is disposed in the upper housing chamber and is operable to convey electrical energy to a wireless power receiver positioned at or above the upper surface. A base is coupled to the upper housing and extends downwardly therefrom, the base being configured for insertion into an opening formed in the work surface or into a space defined between two adjacent work surfaces. The base is further configured to facilitate securing the electrical power unit to the work surface or the adjacent work surfaces.

20 Claims, 14 Drawing Sheets

(56) References Cited

U.S. PATENT DOCUMENTS

| | | | |
|---|---|---|---|
| 9,608,455 B2 | 3/2017 | Byrne et al. | |
| 9,748,709 B2 | 8/2017 | Byrne et al. | |
| 9,960,642 B2* | 5/2018 | Ozana | H02J 5/005 |
| 10,050,473 B2 | 8/2018 | Byrne et al. | |
| 10,181,735 B2 | 1/2019 | Byrne et al. | |
| 2013/0049482 A1 | 2/2013 | Rofe et al. | |
| 2013/0207478 A1 | 8/2013 | Metcalf et al. | |
| 2014/0050305 A1* | 2/2014 | Zhao | G01N 23/04 |
| | | | 378/141 |
| 2014/0326497 A1* | 11/2014 | Byrne | H02G 3/18 |
| | | | 174/541 |
| 2015/0249343 A1* | 9/2015 | Makwinski | H02J 5/005 |
| | | | 307/104 |
| 2016/0372948 A1* | 12/2016 | Kvols | H02J 7/0042 |
| 2017/0317458 A1 | 11/2017 | Byrne et al. | |

* cited by examiner

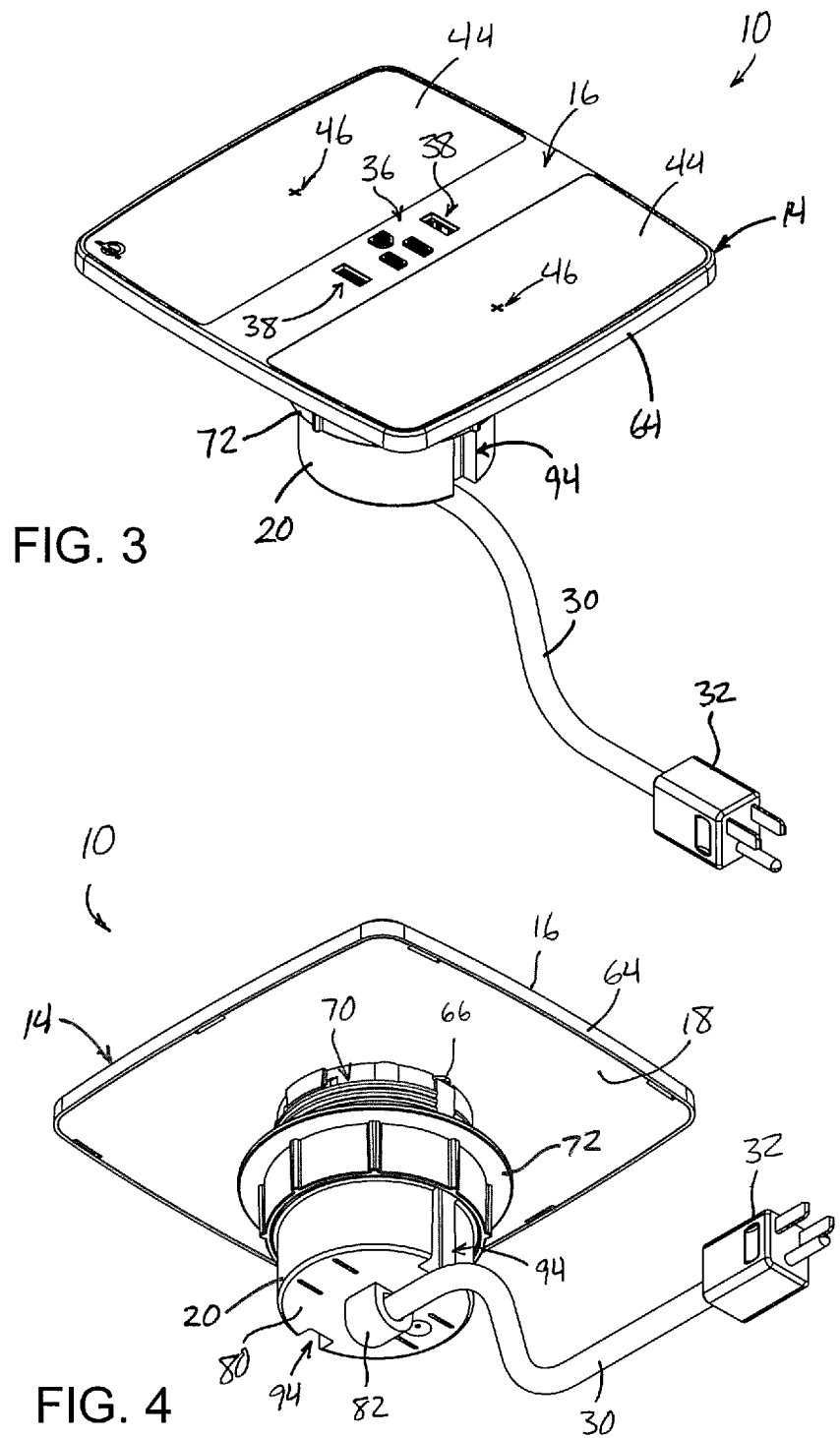

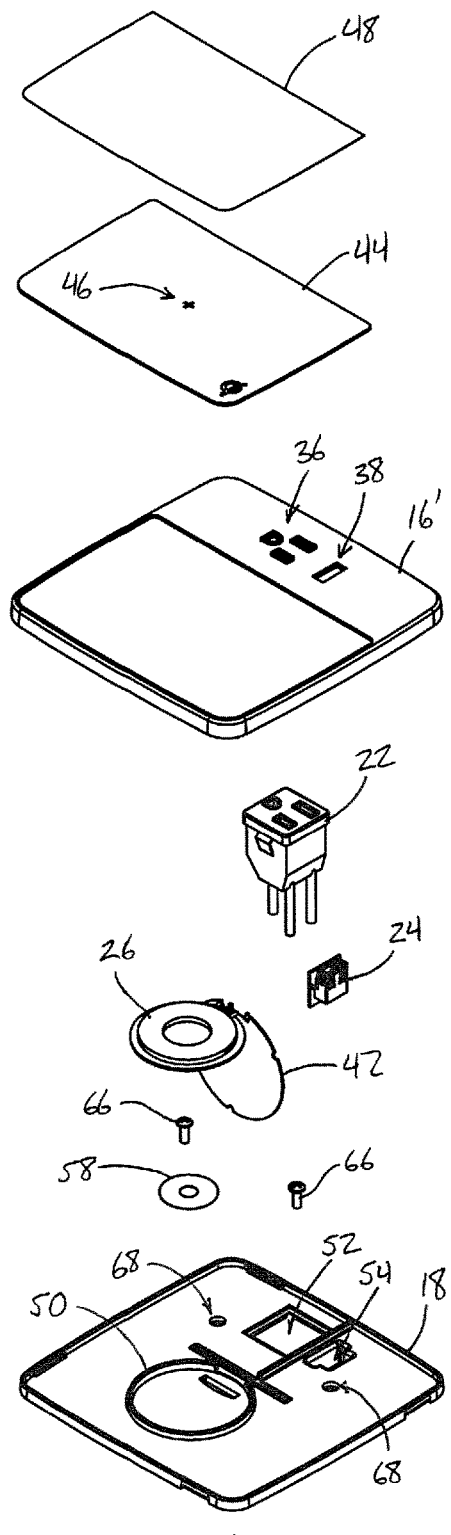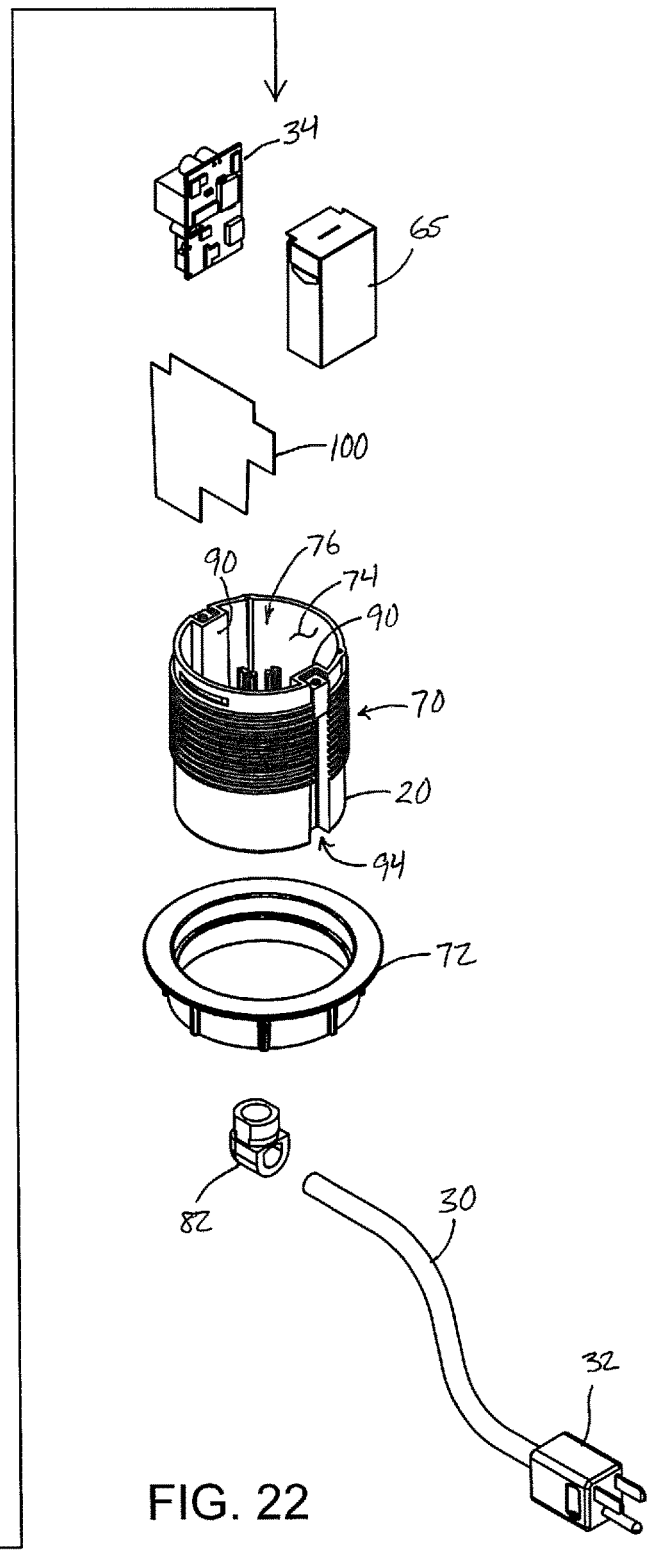
FIG. 22

WORKSURFACE-MOUNTED WIRELESS CHARGING GROMMET

CROSS-REFERENCE TO RELATED APPLICATION

The present application claims the filing benefits of U.S. provisional application Ser. No. 62/330,831, filed May 2, 2016, which is hereby incorporated by reference herein in its entirety.

FIELD OF THE INVENTION

The present invention relates to electrical power and/or data systems with wireless electrical charging capabilities for use in work areas and the like.

BACKGROUND OF THE INVENTION

Electrical power and/or data systems are commonly provided in work areas, such as at, in, or along work tables and desks, conference tables, work area dividers, and the like. Such systems typically provide one or more high voltage AC power outlets, and in some cases provide one or more low voltage DC power outlets and/or electronic data or communications receptacles, or various combinations of these. In addition, various types of wireless power transmission technologies are available, ranging from pads having strips of low voltage electrical conductors of different polarities for direct contact by respective conductors associated with an electrical consumer, to non-contact technologies such as resonant inductive coupling (magnetic field resonance) and electric field resonant capacitive coupling.

SUMMARY OF THE INVENTION

The present invention provides an electrical power unit that is positionable at a work surface and includes an upper housing having an upper surface and a lower surface spaced below the upper surface to define an upper housing chamber. A wireless power transmitter is disposed in the upper housing chamber and is operable to convey electrical energy to a wireless power receiver positioned at or above the upper surface. A base is coupled to the upper housing and extends downwardly therefrom, the base being configured for insertion into an opening formed in the work surface or into a space defined between two adjacent work surfaces. The base is further configured to facilitate securing the electrical power unit to the work surface or the adjacent work surfaces. Optionally, the base may facilitate an edge-mount arrangement, such as with a bracket or clamp. The wireless power transmitter may have a sensing capability so that it will only energize when a compatible wireless power receiver is detected or sensed as being within charging range of the transmitter. Optionally, at least one direct-contact electrical or data receptacle is provided at the upper housing.

According to one form of the present invention, an electrical power unit is positionable at a work surface and includes an upper housing, a lower housing coupled to the upper housing, and a wireless transmitter for conveying electrical energy to a wireless power receiver of a portable electronic device. The upper housing has an upper surface and a lower surface spaced below the upper surface to define an upper housing chamber in which the wireless power transmitter is mounted. The wireless power transmitter is operable to supply power to the portable electronic device when the device is positioned at or above the upper surface. The lower housing is coupled to the upper housing and extends downwardly from the lower surface thereof, and at least a portion of the lower housing is configured to be positioned below the work surface and is releasably securable to the work surface.

In one aspect, the lower housing defines a lower housing chamber and there is an electrical conductor disposed in the lower housing chamber. The conductor is in electrical communication with both an electrical power source and the wireless power transmitter.

In another aspect, the lower housing is substantially cylindrical. Optionally, the lower housing has a threaded outer surface for receiving an internally threaded collar.

In yet another aspect, the lower housing has an interior surface defining the lower housing chamber. The lower housing further includes vertical elongate ribs or grooves formed along the interior surface for mounting electrical or electronic components in the lower housing chamber.

In still another aspect, there is an electrical circuit board in electrical communication with the electrical power source and with the wireless power transmitter. The electrical circuit board is operable to supply electrical power to the wireless power transmitter, and the electrical circuit board is insertable into the lower housing chamber via sliding engagement with the substantially vertical elongate ribs or grooves.

In a further aspect, a low voltage DC electrical receptacle is included and is accessible through a receptacle opening in the upper housing. The low voltage DC electrical receptacle includes a lower region disposed in the lower housing chamber, and the low voltage DC electrical receptacle has an electrical converter circuit board that is in electrical communication with the electrical power source. The electrical converter circuit board is slidably insertable into the lower housing chamber via sliding engagement with the elongate ribs or grooves.

In a still further aspect, the lower housing is insertable between respective outer perimeter edges of two adjacent work surfaces. Optionally, the lower housing includes clamping elements that selectively engage the two adjacent work surfaces to secure them together.

In another aspect, the unit includes a high voltage AC receptacle and a low voltage DC receptacle, with at least a portion of each of the high voltage AC receptacle and of the low voltage DC receptacle being disposed in the lower housing chamber.

In still another aspect, the wireless power transmitter is operable to detect when a compatible power receiver is positioned within a transmission range of the wireless power transmitter, and the wireless power transmitter is energized for wireless electrical power transmission only when the compatible power receiver is positioned within the transmission range of the wireless power transmitter.

Accordingly, the electrical power units of the present invention are relatively compact and self-contained devices that can be installed without tools or special training, to provide access to wireless electrical charging plus direct-contact power at a low voltage DC power outlet and/or a high voltage AC power outlet. The power units can be mounted at a common work surface such as a tabletop or desktop, such as for charging portable electronic devices including mobile phones, tablet computers, media players, laptop computers, and other rechargeable or electrically powered devices.

These and other objects, advantages, purposes and features of the present invention will become apparent upon review of the following specification in conjunction with the drawings.

BRIEF DESCRIPTION OF THE DRAWINGS

FIG. 3 is another top perspective view of the double-sided wireless electrical charging grommet of FIG. 1, with the mobile phones omitted;

FIG. 4 is a bottom perspective view of the double-sided wireless electrical charging grommet of FIG. 1;

FIG. 22 is another exploded view of the single-sided wireless electrical charging grommet of FIG. 15, viewed from above;

DESCRIPTION OF THE PREFERRED EMBODIMENTS

Figure 1:
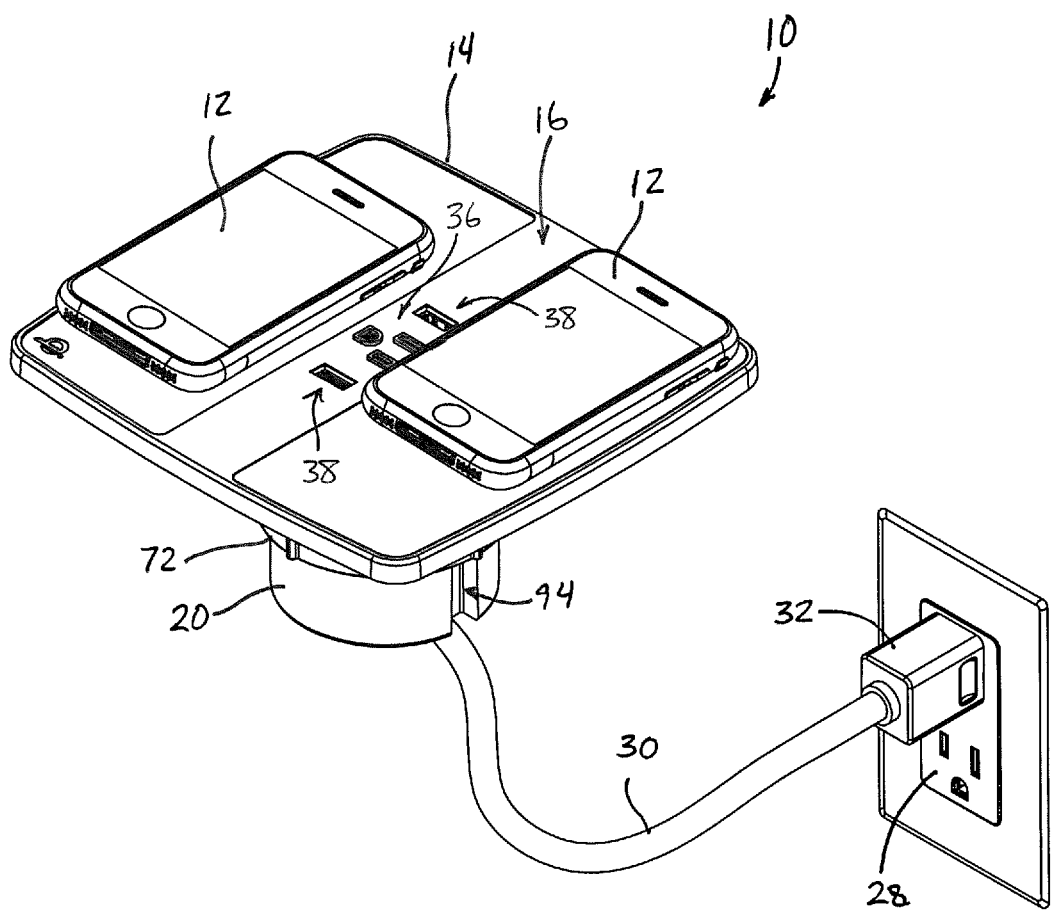
FIG. 1 is a top perspective view of a double-sided wireless electrical charging grommet in accordance with the present invention, shown with two mobile phones positioned thereon for charging.

Referring now to the drawings and the illustrative embodiments depicted therein, an electrical power unit 10 is configured to be positioned in or along a work surface, or between two adjacent work surfaces, and provides wireless power transmission for compatible portable electronic devices 12 that incorporate wireless power receiving technology. Portable electronic devices 12 are illustrated herein as cellular telephones (e.g., "smart phones"), but it will be appreciated that these represent substantially any portable device such as a portable tablet computer or laptop, a smartwatch, or other device with a rechargeable onboard energy storage and a wireless electrical power receiver. The electrical power unit 10 includes an upper housing 14 that is overall generally planar, or that has a generally planar region, and includes an upper surface or panel 16 and a lower surface or panel 18 that is spaced below upper surface 16 (FIG. 1). Upper housing 14 is coupled to a lower housing 20 that is generally cylindrical in shape, and that is sized and shaped to extend downwardly through a hole that is formed or established in a work surface such as a tabletop or desktop, although other mounting surfaces and arrangements are also possible. Lower housing 20 contains wiring and electronics for providing electrical power to both direct-contact electrical outlets 22, 24 and to wireless non-contact power transmitters 26 at upper housing 14 (FIGS. 2, 5 and 6), so that portable electronic devices 12 may be charged using direct-contact connectors (e.g., found on charging cords) or a respective onboard wireless power receiver that is internal to each device 12.

Figure 5:
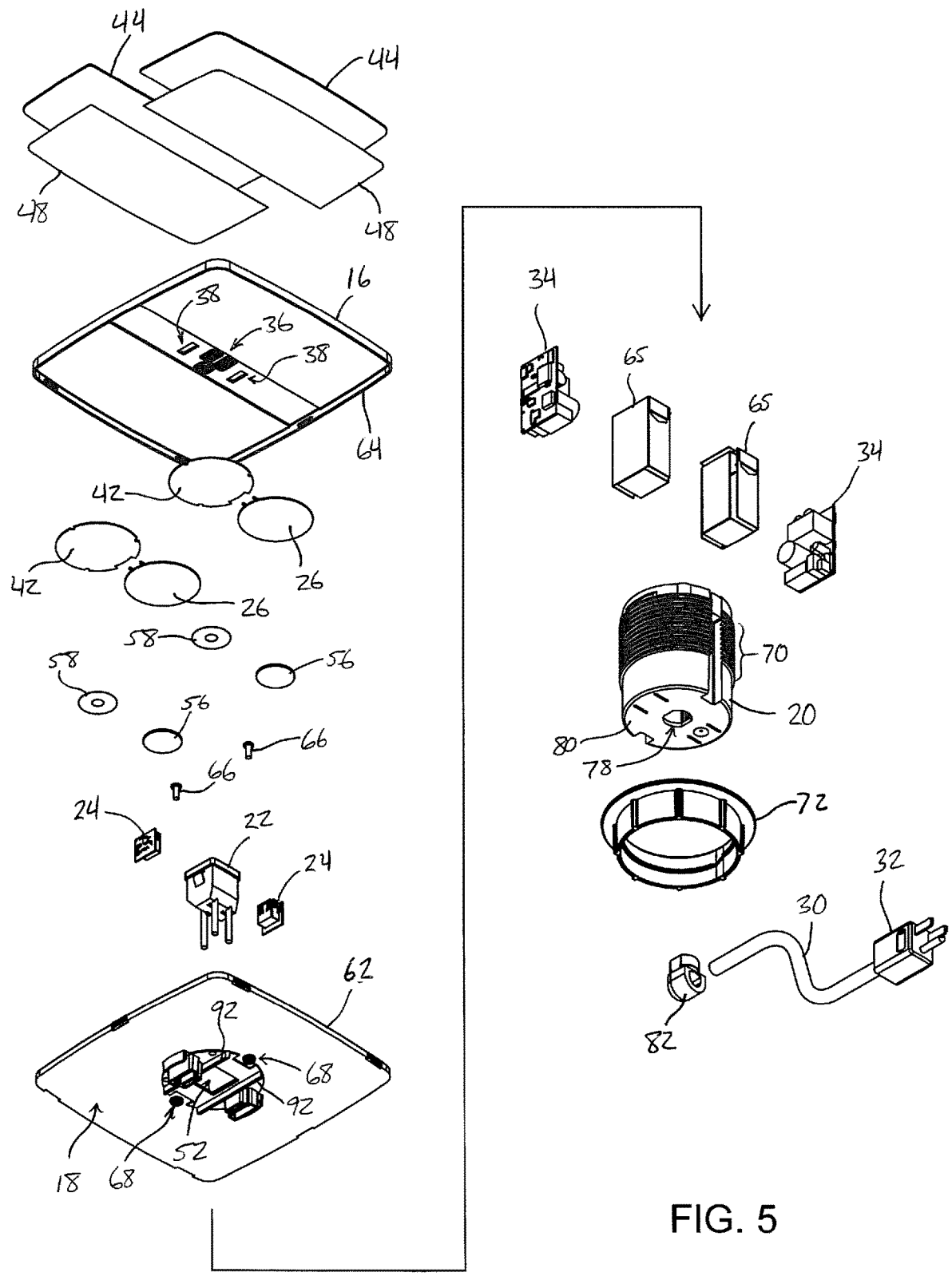
FIG. 5 is an exploded view of the double-sided wireless electrical charging grommet of FIG. 1, viewed from below.
Figure 6:
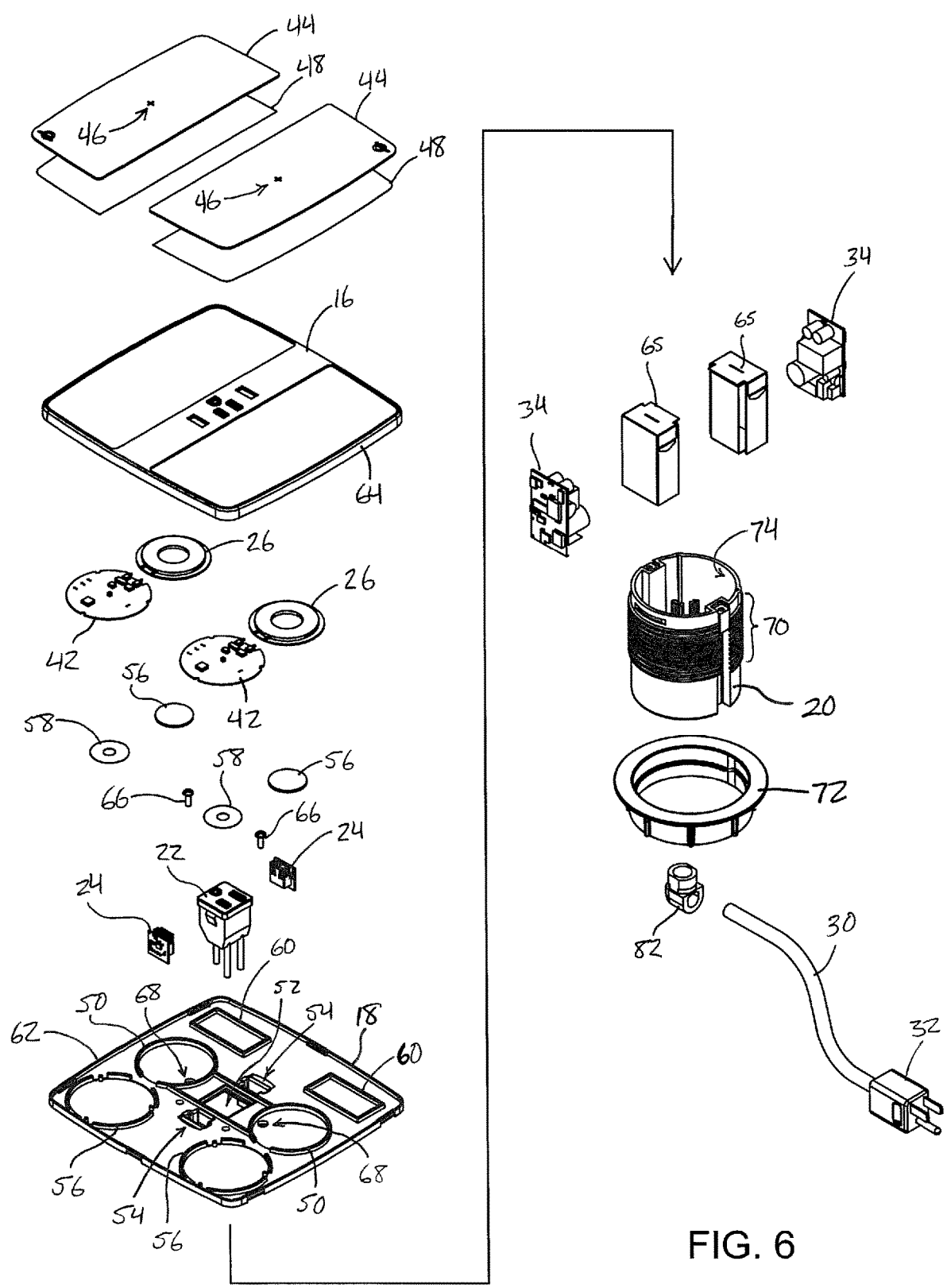
FIG. 6 is another exploded view of the double-sided wireless electrical charging grommet of FIG. 1, viewed from above.

In the illustrated embodiment, electrical power unit 10 receives high voltage AC power, such as at 110V or 220V, from an AC outlet 28 that is energized by electrical mains or source that is associated with the building, vehicle, or area in which electrical power unit 10 is mounted. A multi-conductor wire or power cord 30 with plug 32 directs the AC power received from AC outlet 28 into lower housing 20. When electrical power unit 10 is fitted with its own AC power outlet 22 as shown, power may be supplied directly to AC outlet 22 from power cord 30. Electrical power unit 10 further includes a pair of low voltage DC outlets 24, such as Universal Serial Bus (USB) outlets, which receive low voltage DC power (e.g., at 5V to 18V) indirectly from power cord 30 via respective power converter circuits 34 (FIGS. 5 and 6). Respective openings 36, 38 formed in upper housing 14 provide access through top surface 16 to AC outlet 22 and low voltage DC outlets 24. It will be appreciated that other types of electrical and/or electronic and/or optical data or signal connectors are equally possible.

Figure 2:
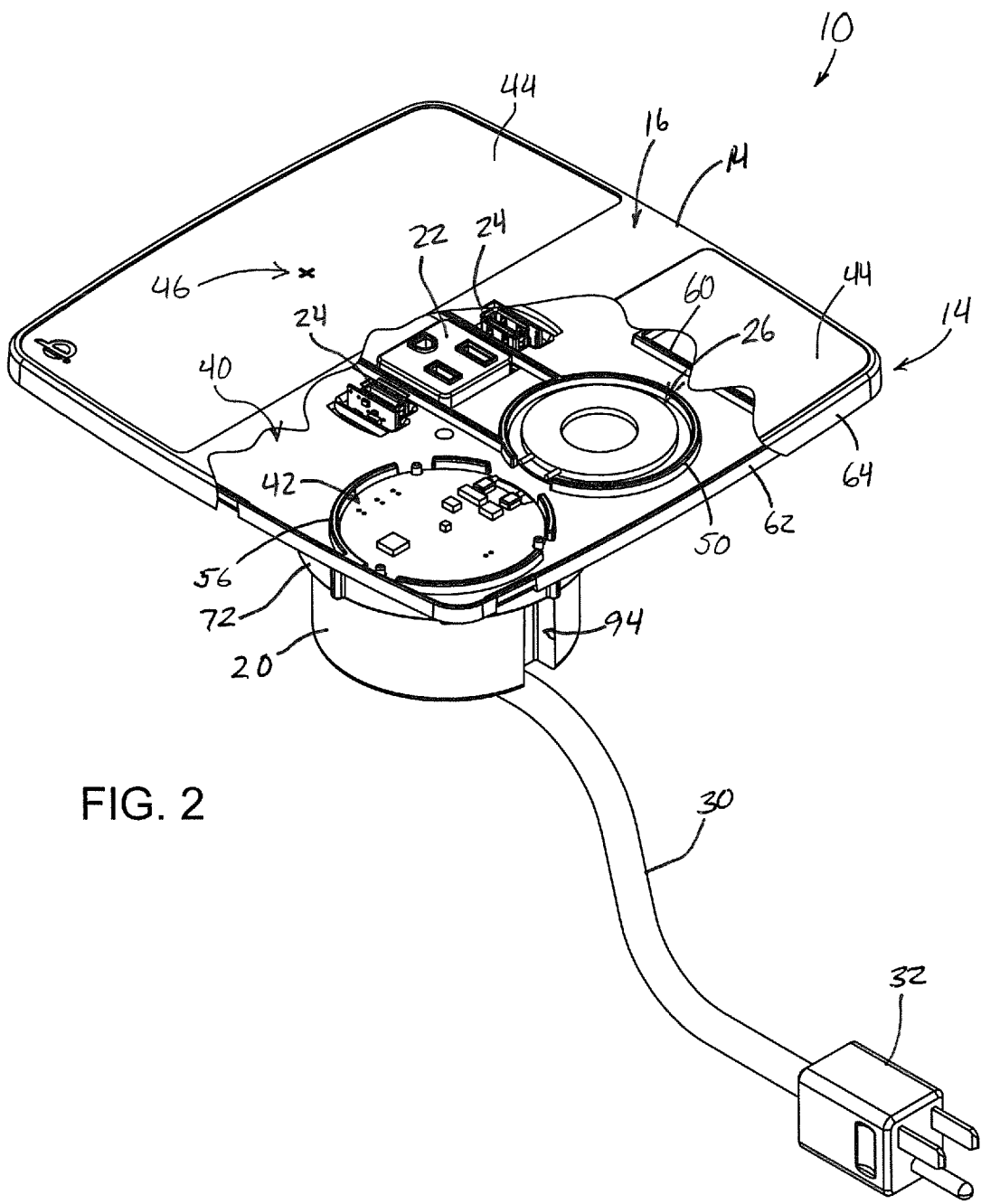
FIG. 2 is another top perspective view of the double-sided wireless electrical charging grommet of FIG. 1, with a portion of the top surface cut away to show internal structure.

The upper and lower surfaces or panels 16, 18 cooperate to define an upper housing chamber 40 for receiving wireless power transmitters 26, wireless power transmission circuitry 42, and into which at least the upper ends of direct-contact outlets 22, 24 protrude from below, such as shown in FIG. 2. Upper panel 16 is optionally fitted with a pair of support pads 44, on either side of outlet openings 36, 38, that provide a desired aesthetic appearance while permitting wireless power transmission therethrough (FIGS. 1-3, 5 and 6). For example, support pads 44 may be finished in substantially any color or pattern, and may be made from different materials such as plastic sheet, wood veneer, leather, rubber or foam rubber, and in some cases metal (provided that the metal does not block wireless power transmission from transmitters 26). In addition, top surfaces of support pads 44 include a visible marking or indicia 46 (FIGS. 2, 3 and 6) that indicates the center of each wireless power transmitter 26, to aid in aligning the wireless power receivers of portable electronic devices 12 with a respective transmitter 26. In the illustrated embodiment, support pads 44 are attached to upper panel 16 by respective double-sided adhesive sheets 48, although other attachment devices such as magnets, hook-and-loop fasteners, and resilient clips (such as those described in commonly-owned U.S. Pat. No. 9,000,298, which is hereby incorporated herein by reference), are among available alternatives.

Lower panel 18 acts as a support tray for various electrical and electronic components during assembly of upper housing 14. Referring to FIGS. 2 and 6, a pair of generally circular upstanding walls 50 are approximately centered on either side of outlet openings 52, 54 in which direct-contact outlets 22, 24 are respectively mounted, with circular walls 50 receiving respective wireless power transmitters 26. Adjacent each circular wall 50 is another generally circular wall 56, which is made up of several distinct wall portions in a circular arrangement. Walls 56 receive respective disc-shaped circuit boards of wireless power transmission circuitry 42, which are electrically connected to respective wireless power transmitters 26. Respective adhesive and/or padded discs 56, 58 may be used in mounting wireless power transmitters 26 and wireless power transmission circuitry 42 in the areas of lower panel 18 that are surrounded by circular walls 50, 56.

In addition, rectangular upstanding walls 60 are provided along lower panel 18, located to the side of circular walls 50 opposite the circular walls 56 for power transmission circuitry 42. Rectangular upstanding walls 60 engage an underside of upper panel 16 upon assembly, and provide structural support for upper panel 16 (as do circular walls 50, 56) when upper housing 14 is assembled. This support limits or substantially prevents downward deflection of upper panel 16 if heavy loads (such as a stack of books) are applied to upper panel 16, and the support provided by circular walls 50, 56 protects the wireless power transmitters 26 and associated circuitry 42 from damage under such load conditions. Additional support at the edges is provided by an upstanding perimeter wall 62 of lower panel 18, which is spaced just inside a downwardly-extending perimeter wall 64 of upper panel 16, such as shown in FIGS. 2 and 4. Electrical power converter circuits 34 are protected by respective dielectric paper sleeves 65 (FIGS. 5 and 6) that resist heat and abrasion damage to the circuit components during installation and use. Threaded fasteners 66 extend through respective holes 68 formed in lower panel 18, inside each circular wall 50, and are used to secure upper housing 14 to lower housing 20 as will be described in more detail below.

Figure 19A:
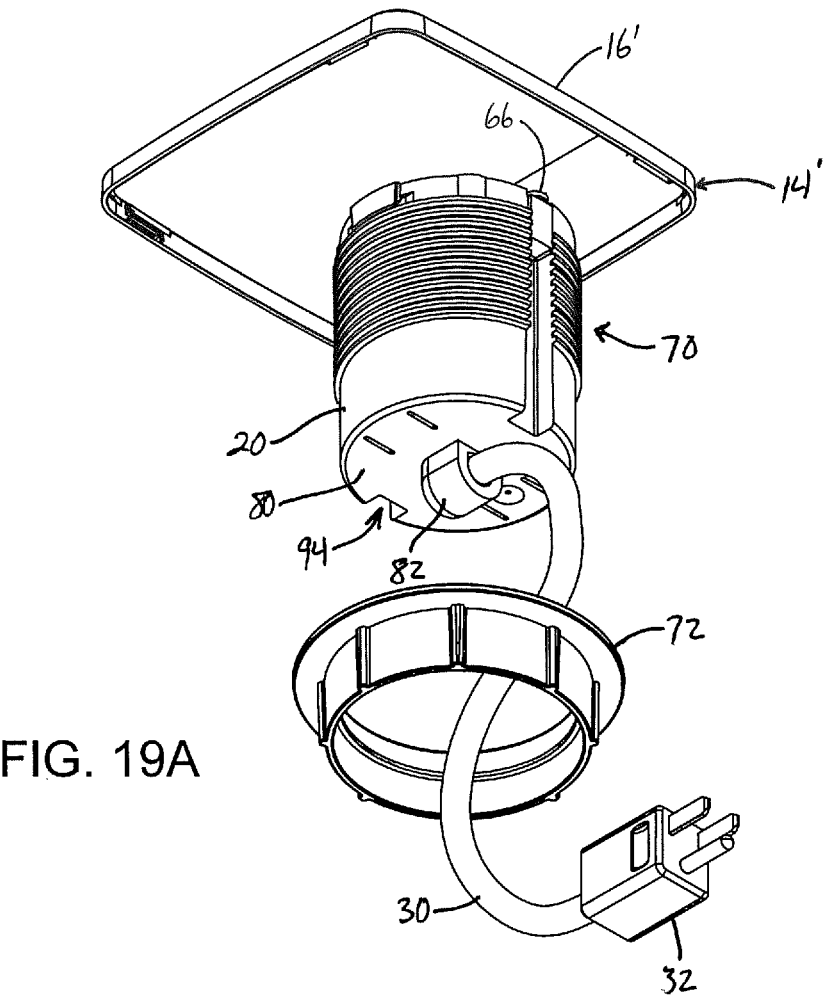
FIGS. 19A and 19B are additional bottom perspective views of the single-sided wireless electrical charging grommet, depicting attachment of the threaded collar for securing the charging grommet to a work surface.
Figure 19B:
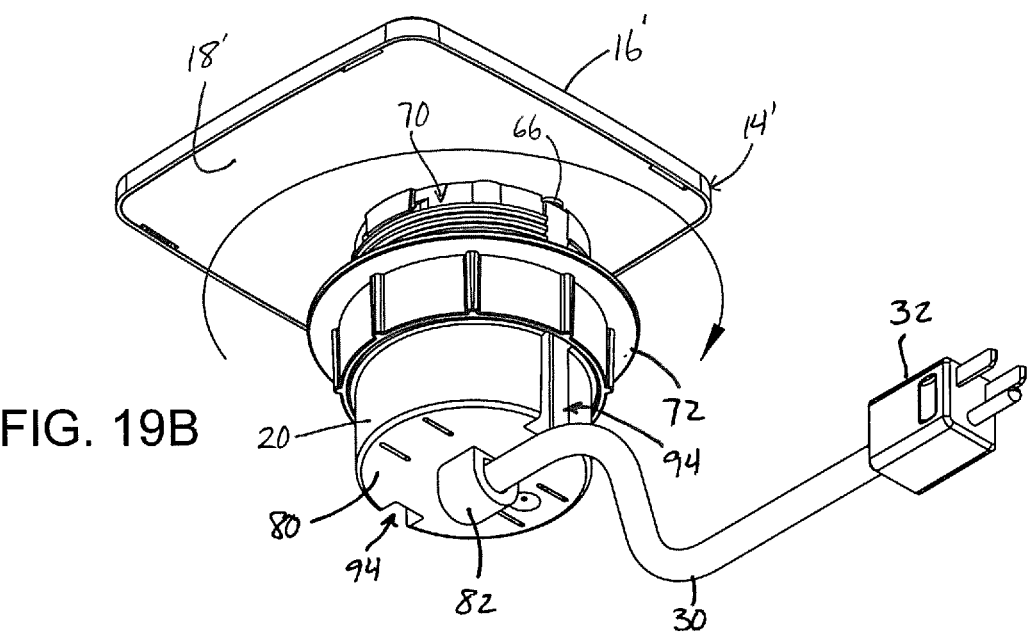

As noted above, lower housing 20 is configured for insertion into a generally circular opening formed in a work surface. Lower housing 20 is configured to facilitate securing the electrical power unit 10 to the work surface at the opening formed therein, and includes a threaded outer surface 70 for receiving a clamping element in the form of an internally threaded collar 72 (FIGS. 4-6 and 10-14) such as shown in the context of a similar embodiment in FIGS. 19A and 19B. The use of a threaded base and threaded collar for attachment of an electrical or electronic device to a work surface is more fully described in commonly-owned U.S. Pat. No. 9,148,006, which is hereby incorporated herein by reference in its entirety. Because the height or depth of direct-contact electrical or data receptacles 22, 24 may be expected to exceed the thickness of upper housing 14, it may be advantageous for lower housing 20 to be located directly below the direct-contact electrical or data receptacles 22, 24 so that their lower regions are received in an upper end portion of the lower housing 20, thus preserving the low profile of upper housing 14 along a work surface.

Figure 7:
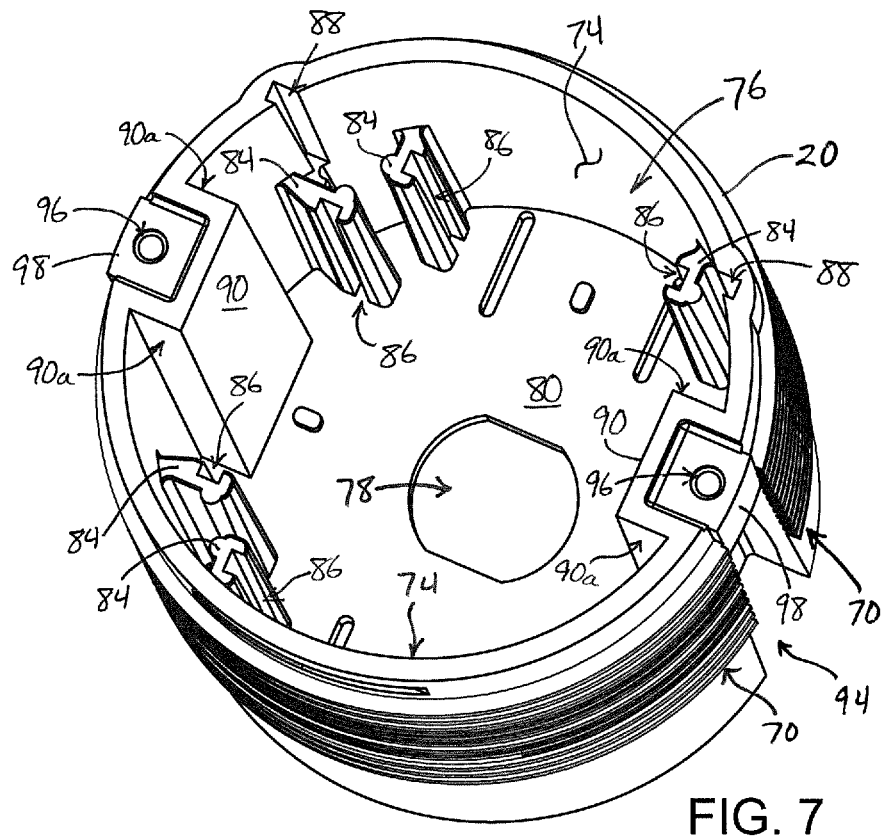
FIG. 7 is a top perspective view of the base of the wireless electrical charging grommet.

Lower housing 20 has a generally cylindrical inner surface 74 defining a lower chamber 76, such as shown in FIG. 7. Lower chamber 76 receives the electrical conductors of power cord 30 through a bottom opening 78 that is formed in a bottom wall 80 of lower housing 20. The electrical conductors of power cord 30 are connected to electrical power converters 34, wireless power transmission circuitry 42, and high voltage AC power outlet 22 inside lower chamber 76. The conductors of power cord 30 are strain-relieved by a soft strain relief 82, such as a rubber grommet, which is disposed around power cord 30 and inserted into bottom opening 78. Strain relief 82 serves to limit or prevent tension on the power cord 30 from being transferred into the corresponding wiring inside chamber 76 and any circuitry or electrical connections disposed therein.

In the illustrated embodiment, and with reference to FIG. 7, lower housing 20 includes a plurality of substantially vertical elongate ribs 84 that extend inwardly from inner surface 74. Each rib 84 defines a respective groove 86 that is spaced inwardly from the interior surface, with pairs of grooves 86 (of respective ribs 84) facing each other to facilitate insertion and supporting of respective ends of the generally planar circuit boards of power converter circuits 34. In the illustrated embodiment, three pairs of ribs 84 and corresponding grooves 86 provide insertion and mounting spaces for up to three circuit boards or other generally planar structures to be positioned inside lower housing chamber 76. Thus, lower housing chamber 76 provides sufficient space for at least lower end portions of direct-contact electricals 22, 24 and associated circuitry 34 and/or 42, and also for electrical conductors of the power cord 30.

Additional grooves 88 and rectangular inward projections 90 are formed in inner cylindrical surface 74 to facilitate alignment and attachment of lower housing 20 to upper housing 14. For example, grooves 88 may be engaged by respective projections associated with upper housing 14 when lower housing 20 is properly aligned with upper housing 14. Similarly, outwardly-facing surfaces 90a of each rectangular inward projection 90 may be engaged by an end of a respective elongate rib 92 (FIG. 5) that extends downwardly from lower panel 18 of upper housing 14.

Figure 8:
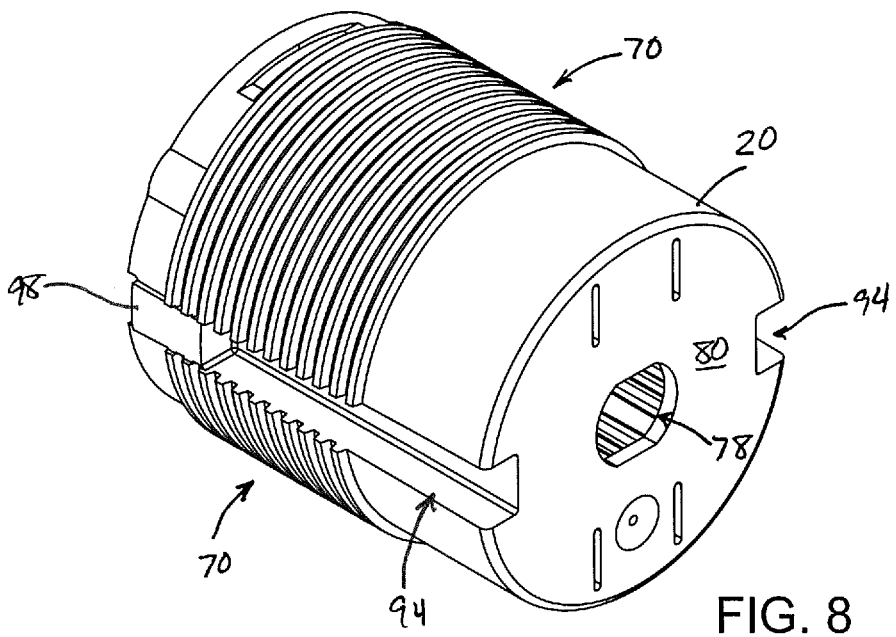
FIG. 8 is a bottom perspective view of the base of the wireless electrical charging grommet.
Figure 9:
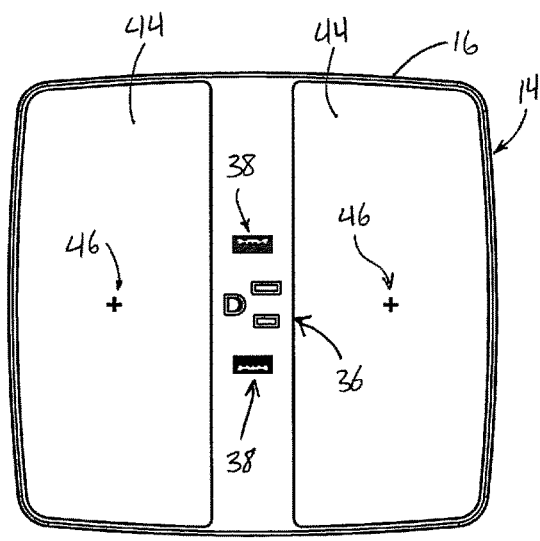
FIG. 9 is a top plan view of the double-sided wireless electrical charging grommet.
Figure 10:
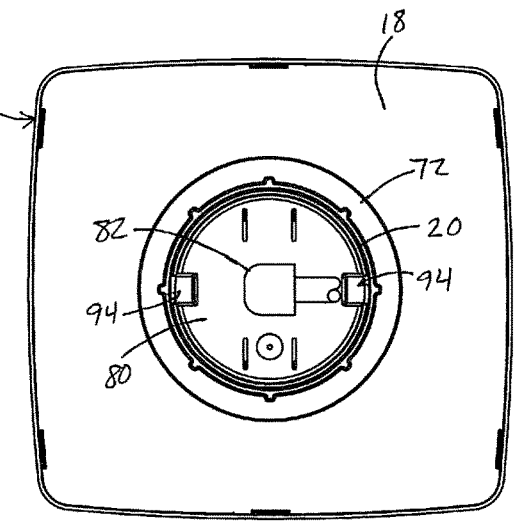
FIG. 10 is a bottom plan view of the double-sided wireless electrical charging grommet.
Figure 11:
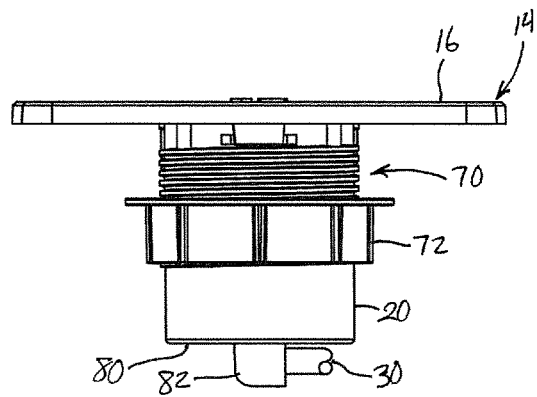
FIG. 11 is a side view of the double-sided wireless electrical charging grommet.
Figure 12:
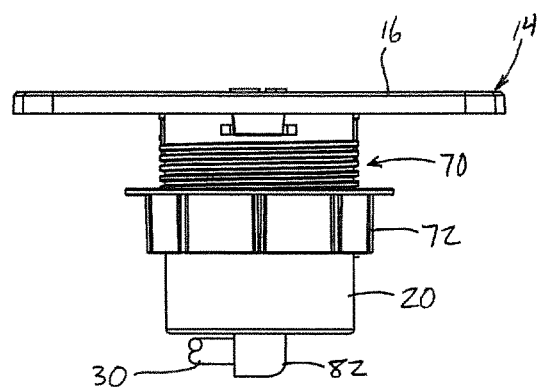
FIG. 12 is an opposite side view of the double-sided wireless electrical charging grommet.
Figure 13:
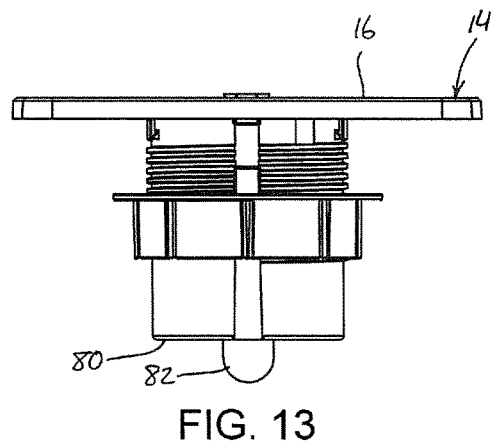
FIG. 13 is an end view of the double-sided wireless electrical charging grommet.
Figure 14:
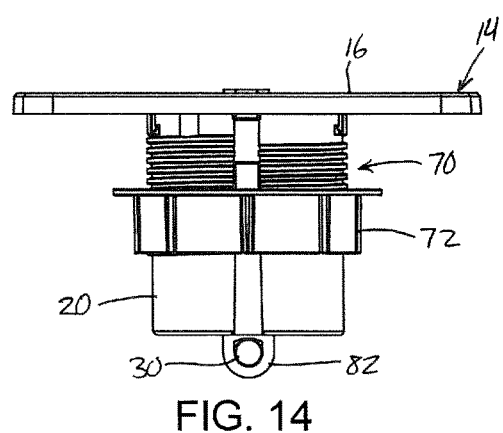
FIG. 14 is an opposite end view of the double-sided wireless electrical charging grommet.
Figure 15:
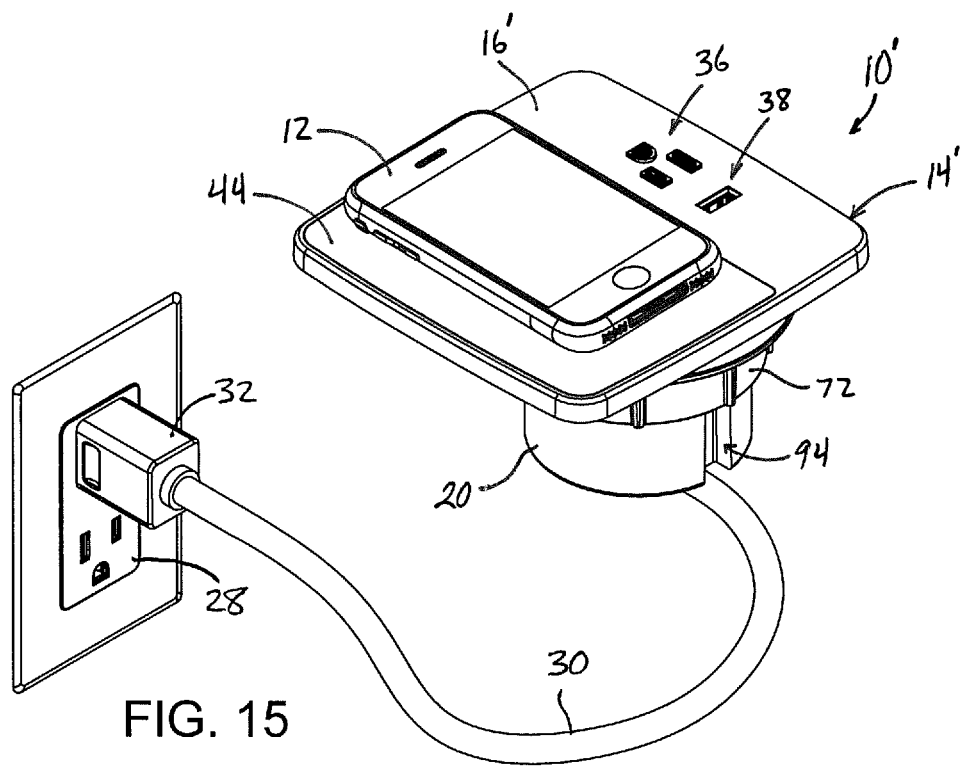
FIG. 15 is a top perspective view of a single-sided wireless electrical charging grommet in accordance with the present invention, shown with a mobile phone positioned thereon for charging.
Figure 16:
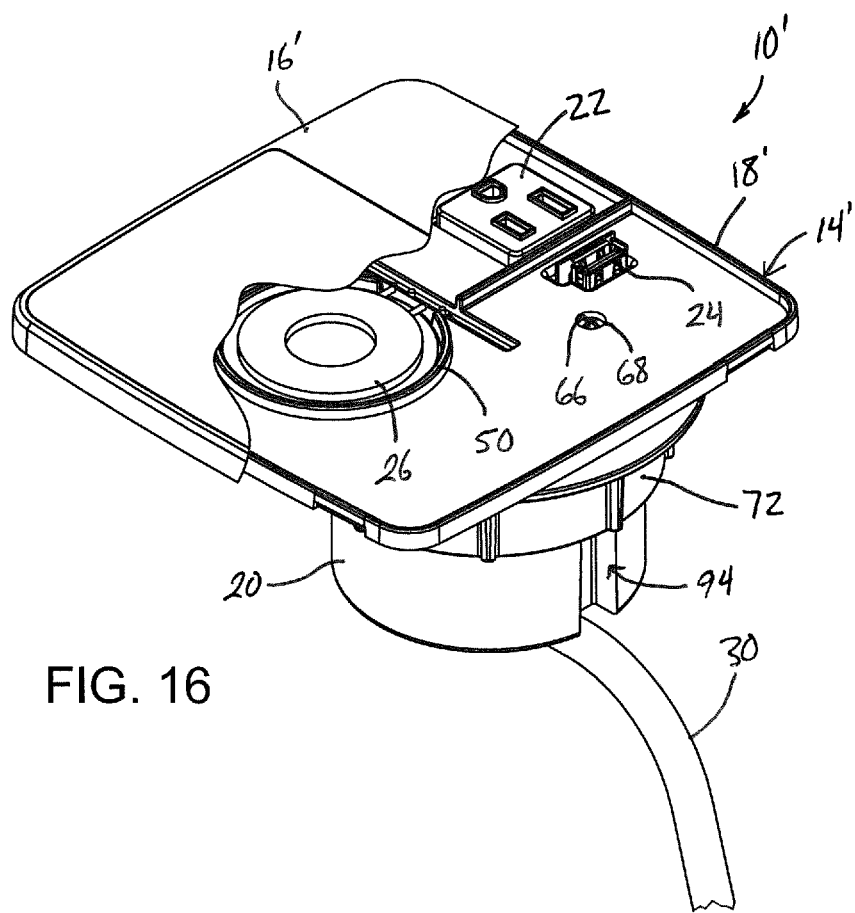
FIG. 16 is another top perspective view of the single-sided wireless electrical charging grommet of FIG. 15, with a portion of the top surface cut away to show internal structure.
Figure 17:
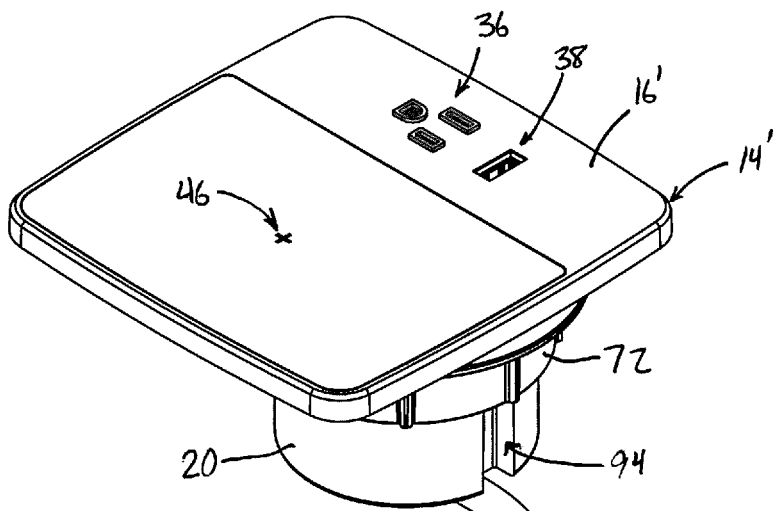
FIG. 17 is another top perspective view of the single-sided wireless electrical charging grommet of FIG. 15, with the mobile phone omitted.
Figure 18:
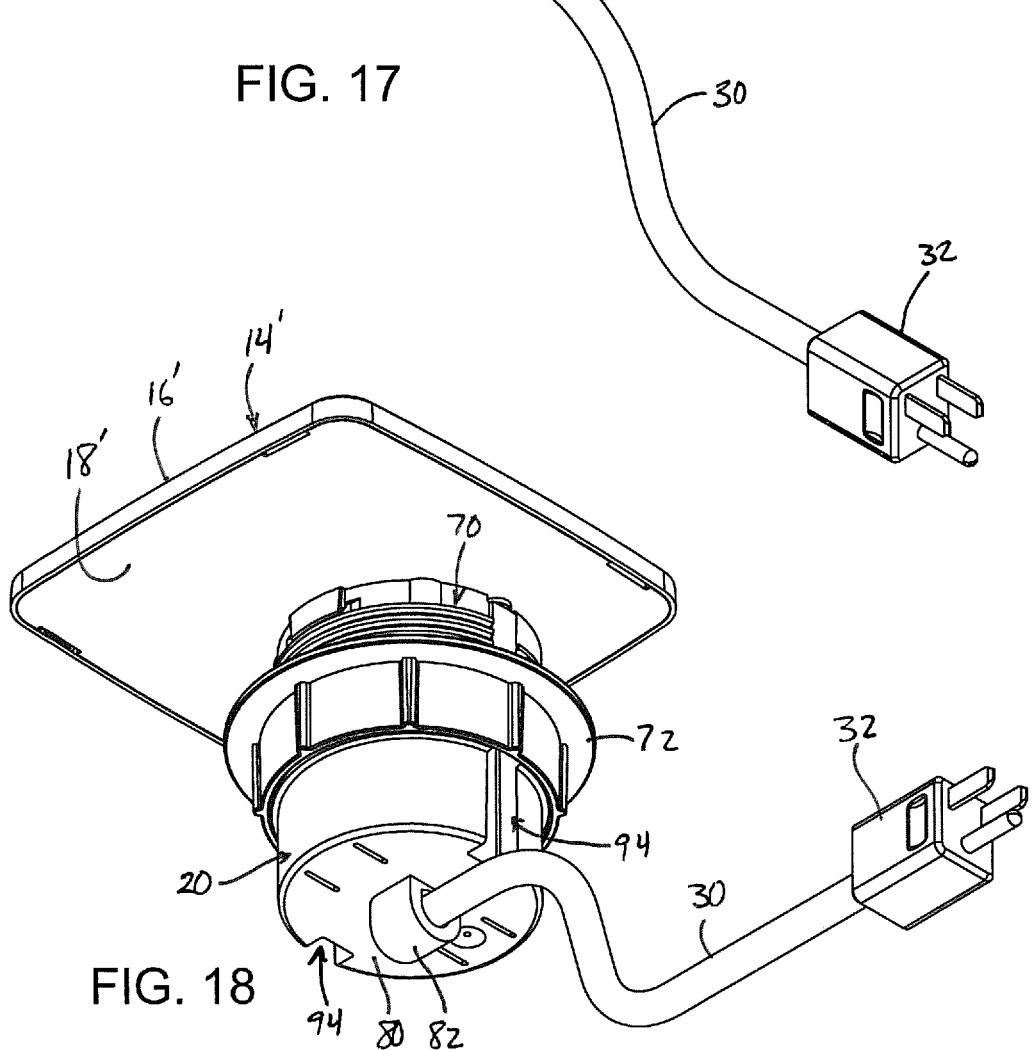
FIG. 18 is a bottom perspective view of the single-sided wireless electrical charging grommet of FIG. 15.

Corresponding to respective rectangular inward projections 90 are elongate channels 94 formed in an outer surface of lower housing 20 (FIGS. 7 and 8), which channels 94 provide clearance for a screwdriver or other tool to access fasteners 66 that engage respective openings 96 at the upper ends of elongate channels 94 and corresponding inward projections 90. Openings 96 may be threaded bores formed in respective inserts that are received in the elongate channels 94, or may be formed in surfaces 98 that are unitarily formed with lower housing 20. Openings 96 may instead be smooth bores that allow fasteners to pass through from below, and into threaded openings 68 formed in lower panel 18 of upper housing 14, for securing lower housing 20 to upper housing 14.

Wireless power transmitters 26 and their associated circuitry 42 may be capable of detecting or sensing when a compatible power receiver is positioned within transmission range of the wireless power transmitter 26, so that the wireless power transmitter 26 can be selectively energized for wireless electrical power transmission only when the compatible power receiver is positioned within transmission range. Substantially any transmission range is envisioned, such as at least 1.0 to 1.6 inches, although greater transmission ranges are possible with current technologies including electric field resonant capacitive coupling technologies. Power transmitter 26 may meet Qi® wireless charging protocols for resonant inductive couplings, for example. Wireless power transmitters and their capabilities are more fully described in co-pending and commonly owned U.S. provisional application, Ser. No. 62/330,712, entitled "ELECTRICAL POWER UNIT WITH WIRELESS CHARGING", filed May 2, 2016, which is hereby incorporated herein by reference in its entirety.

It is envisioned that other versions of electrical power unit may provide more or fewer direct-contact electrical receptacles 22, 24, and more or fewer wireless power transmitters 26. For example, with reference to FIGS. 15-28 there is shown a single-wireless electrical power unit 10' having an upper housing 14' with wireless power transmitter 26 along only one side thereof, which upper housing 14' is made more compact by positioning wireless power transmission circuitry 42 in vertical alignment inside of lower housing 20, such as shown in FIGS. 21 and 22. Single-wireless electrical power unit 10' includes a single wireless transmitter 26 in an upper housing chamber 40' defined between an upper panel 16 and lower panel 18', plus a single high voltage AC outlet 22 and a single low voltage DC outlet 24. Because wireless power transmission circuity 42 may be sensitive to interference and is positioned inside lower housing 20', in closer proximity to high voltage AC wiring than when wireless power transmission circuity 42 is positioned in upper housing 14, a divider or isolator plate or wall 100 (FIGS. 21 and 22) may be positioned between wireless power transmission circuity 42 and high voltage AC receptacle 22 and associated AC wiring. In other respects, single-wireless electrical power unit 10' may be substantially similar or identical to the electrical power unit 10 described above, such that a full understanding of single-wireless electrical power unit 10' may be obtained with reference to FIGS. 15-28 and the above descriptions.

Figure 20A:
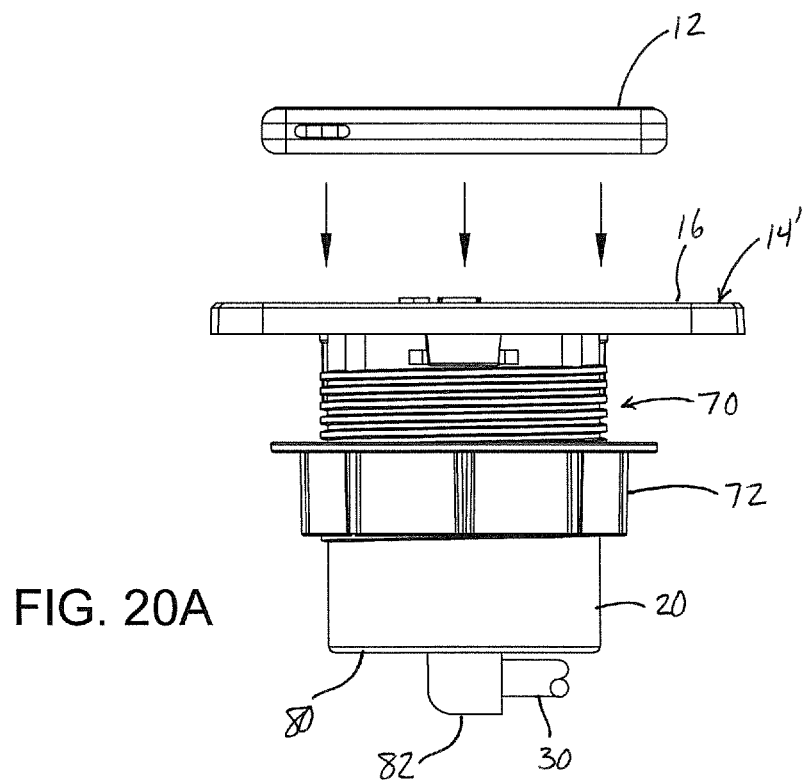
FIGS. 20A and 20B are side elevation views of the single-sided wireless electrical charging grommet, depicting placement of the mobile phone for wireless charging.
Figure 20B:
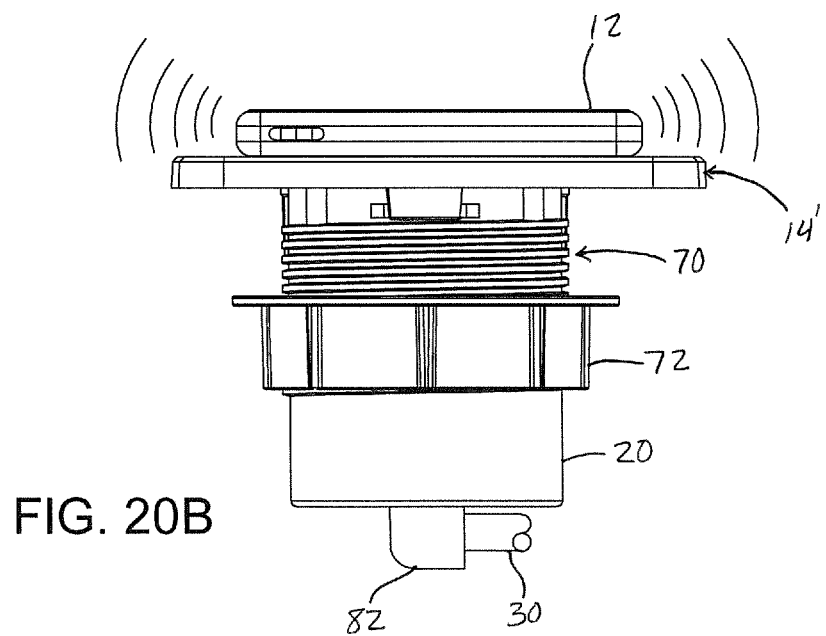
Figure 21:
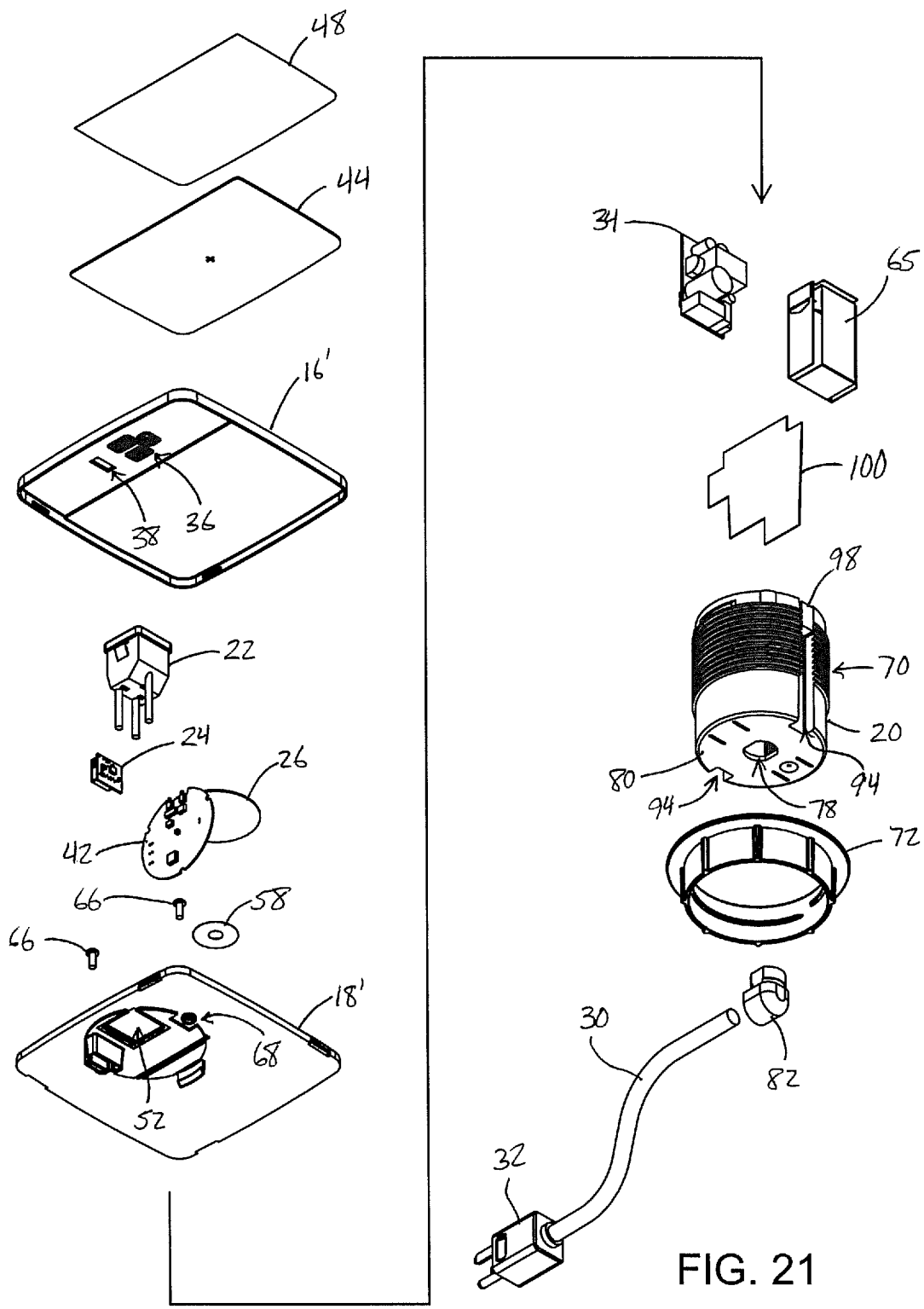
FIG. 21 is an exploded view of the single-sided wireless electrical charging grommet of FIG. 15, viewed from below.
Figure 23:
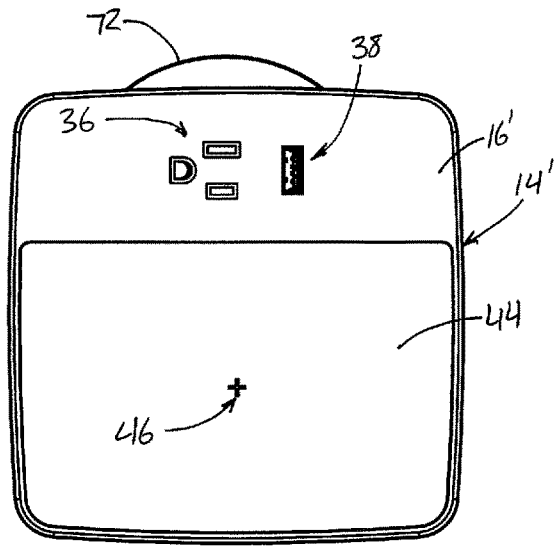
FIG. 23 is a top plan view of the single-sided wireless electrical charging grommet.
Figure 24:
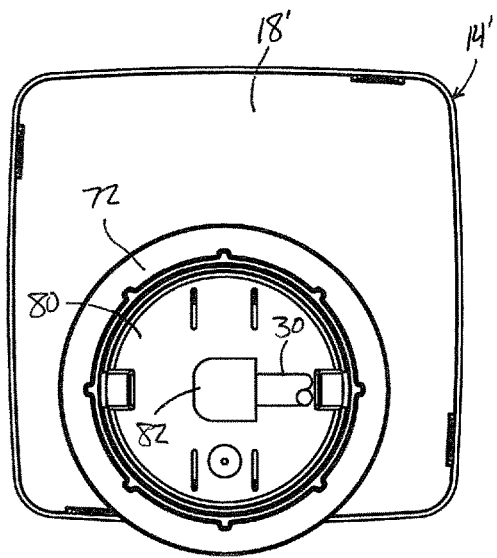
FIG. 24 is a bottom plan view of the single-sided wireless electrical charging grommet.
Figure 25:
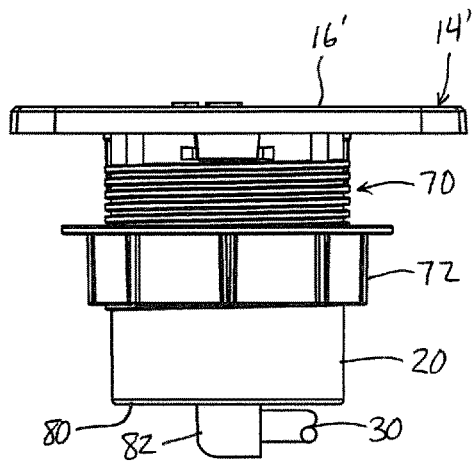
FIG. 25 is a side view of the single-sided wireless electrical charging grommet.
Figure 26:
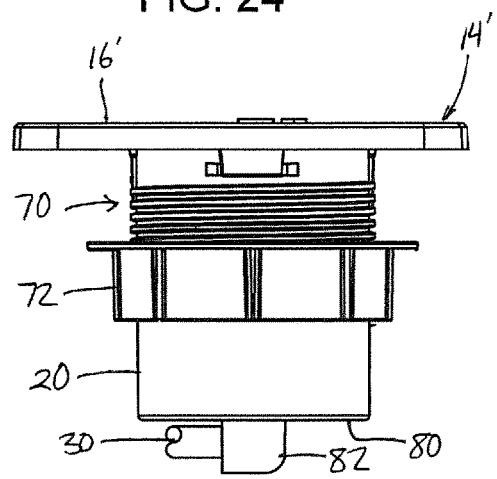
FIG. 26 is an opposite side view of the single-sided wireless electrical charging grommet.
Figure 27:
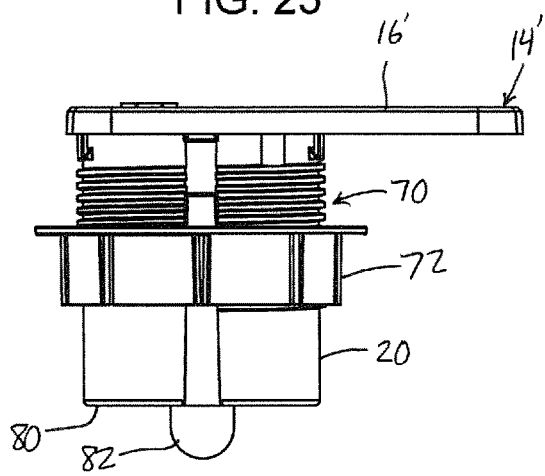
FIG. 27 is an end view of the single-sided wireless electrical charging grommet.
Figure 28:
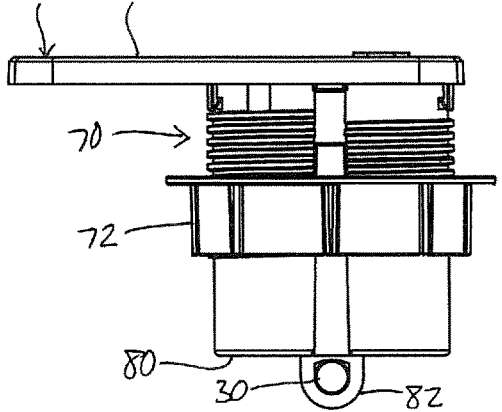
FIG. 28 is an opposite end view of the single-sided wireless electrical charging grommet.

Referring now to FIGS. 19A-20B there are shown steps of securing single-wireless electrical power unit 10' to a work surface (FIGS. 19A and 19B), and steps of wirelessly energizing a portable electronic device 12 using the single-wireless electrical power unit 10' (FIGS. 20A and 20B). A work surface is not depicted in FIGS. 19A-20B, but it will be appreciated that a work surface would be positioned between an upper flange of threaded collar 72 and the lower panel 18' of upper housing 14'. To install single-wireless electrical power unit 10', its plug 32, cord 30, and lower housing 20 are initially inserted through a top of an opening formed in the work surface, and then the plug 32 and cord 30 are inserted through the threaded collar 72 (FIG. 19A), which is manually threaded onto lower housing 20 at threaded outer surface 70, as indicated with a curved arrow in FIG. 19B. Threaded collar 72 is tightened against an underside of the work surface to secure electrical power unit 10' in place.

To use electrical power unit 10' for wireless charging of a portable electronic device 12, plug 32 is inserted into a compatible and energized AC power outlet 22, and then the portable electronic device 12 (having an onboard wireless power receiver that is compatible with transmitter 26 of power unit 10') is sufficiently aligned with the indicia 46 at support pad 44 on upper panel 16' of upper housing 14', and lowered onto support pad 44, such as shown in FIGS. 20A and 20B. Optionally, portable electronic device 12 may provide the user with a visual and/or audible indication, illustrated with curved lines emanating from opposite ends of device 12 in FIG. 20B, that the device 12 is being wirelessly charged. Optionally, other devices may receive power from power unit 10' by plugging into direct contact receptacles 22, 24, even while a first device is charging wirelessly. It will be appreciated that the double-wireless electrical power unit 10 described above can be installed and used in substantially the same manner.

Variations on the above-described embodiments are also considered within the scope of the present invention. For example, in one arrangement that may be considered an alternative to cylindrical base 20 and threaded collar 72, a lower housing may be provided which is configured for insertion between respective outer perimeter edges of two adjacent ones of the work surfaces, such as in one of the manners described in commonly-owned U.S. Pat. No. 9,220,342, which is hereby incorporated herein by reference in its entirety. In one such arrangement, the lower housing may include one or more clamping elements that are configured to selectively engage the two adjacent work surfaces to thereby secure the adjacent work surfaces together. A similar base may be configured as an edge-clamp for mounting at the edge of a work surface, without need for a hole formed through the work surface.

Thus, the electrical power units provide self-contained devices that can be plugged into conventional wall outlets or other power supplies, and mounted at a common work surface such as a tabletop or desktop, to provide users of a work area with convenience access to high voltage and/or low voltage electrical power, such as for charging portable electronic devices. Wireless charging technology built into the upper housing provides additional convenience for users with compatible portable electronic devices, since these do not require separate plugging in to direct-contact receptacles for charging. Moreover, the electrical power units may be installed, removed, and relocated without the use of tools.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power unit configured to be positioned at a work surface, said electrical power unit comprising:
   a generally planar upper housing including a planar upper surface and a planar lower surface spaced below and parallel to said upper surface to define an upper housing chamber;
   a wireless power transmitter disposed in said upper housing chamber and operable to convey electrical energy to a wireless power receiver positioned at or above said upper surface;

a lower housing coupled to said upper housing and extending downwardly from said lower surface, wherein at least a portion of said lower housing is configured to be positioned below the work surface; and a direct-contact electrical or data receptacle accessible through said upper surface at a central region of said upper housing, said direct-contact electrical or data receptacle having a lower receptacle portion extending downwardly into said lower housing;

wherein said upper housing extends laterally outwardly from said lower housing and terminates at a perimeter edge region that is spaced laterally outwardly from said lower housing, said wireless power transmitter is spaced laterally outboard of said direct-contact electrical or data receptacle, and at least a portion of said wireless power transmitter is positioned laterally between said perimeter edge region and said lower housing such that said wireless power transmitter is positionable directly above the work surface; and wherein said lower housing is releasably securable to the work surface with said perimeter edge region of said upper housing and at least a portion of said wireless power transmitter positioned directly above the work surface.

2. The electrical power unit of claim 1, wherein said lower housing defines a lower housing chamber, said power unit further comprising at least one electrical conductor disposed in said lower housing chamber and in electrical communication with both an electrical power source and said wireless power transmitter.

3. The electrical power unit of claim 2, wherein said lower housing is substantially cylindrical and the entirety of said perimeter edge region of said upper housing is spaced laterally outwardly from lower housing.

4. The electrical power unit of claim 3, wherein said lower housing comprises a threaded outer surface for receiving an internally threaded collar.

5. The electrical power unit of claim 3, wherein said lower housing comprises an interior surface defining said lower housing chamber, and wherein said lower housing comprises one or more substantially vertical elongate ribs or grooves formed along said interior surface.

6. The electrical power unit of claim 5, further comprising an electrical circuit board in electrical communication with the electrical power source and with said wireless power transmitter, wherein said electrical circuit board is operable to supply electrical power to said wireless power transmitter, and wherein said electrical circuit board is configured for slidable insertion into said lower housing chamber via sliding engagement with said substantially vertical elongate ribs or grooves.

7. The electrical power unit of claim 5, wherein said direct-contact electrical or data receptacle comprises a low voltage DC electrical receptacle accessible through a receptacle opening in said upper housing, said low voltage DC electrical receptacle having an electrical converter circuit board in electrical communication with the electrical power source, and wherein said electrical converter circuit board is configured for slidable insertion into said lower housing chamber via sliding engagement with said substantially vertical elongate ribs or grooves.

8. The electrical power unit of claim 1, wherein said lower housing is configured for insertion between respective outer perimeter edges of two adjacent work surfaces.

9. The electrical power unit of claim 8, wherein said lower housing comprises clamping elements configured to selectively engage the two adjacent work surfaces to thereby secure the two adjacent work surfaces together.

10. The electrical power unit of claim 1, wherein said wireless power transmitter is fully enclosed in said upper housing chamber.

11. The electrical power unit of claim 1, wherein said at least one direct-contact electrical or data receptacle comprises a high voltage AC receptacle and a low voltage DC receptacle.

12. The electrical power unit of claim 11, wherein said lower receptacle portion of each of said high voltage AC receptacle and said low voltage DC receptacle extends downwardly through said lower surface of said upper housing.

13. The electrical power unit of claim 11, comprising at least two of said wireless power transmitters in spaced arrangement in said upper housing chamber and positioned on opposite sides of said high voltage AC receptacle and said low voltage DC receptacle.

14. The electrical power unit of claim 1, wherein said wireless power transmitter is operable to detect when a compatible power receiver is positioned within a transmission range of said wireless power transmitter, and wherein said wireless power transmitter is energized for wireless electrical power transmission only when the compatible power receiver is positioned within the transmission range of said wireless power transmitter.

15. An electrical power unit configured to be positioned at a work surface, said electrical power unit comprising:

a generally planar upper housing including an upper surface and a lower surface spaced below said upper surface to define an upper housing chamber, said upper housing comprising a central region and a perimeter region laterally outboard of said central region;

a wireless power transmitter disposed in said perimeter region of said upper housing chamber and operable to convey electrical energy to a wireless power receiver positioned at or above said upper surface;

a lower housing coupled to said central region of said upper housing and extending downwardly therefrom, with said perimeter region of said upper housing extending laterally outwardly from said lower housing, said lower housing defining a lower housing chamber, said lower housing configured for insertion into an opening formed in the work surface or into a space defined between two adjacent work surfaces;

at least one direct-contact electrical or data receptacle accessible through said upper surface at said central region of said upper housing and having a lower receptacle portion disposed in said lower housing chamber; and a clamping element coupled to said lower housing and operable to secure said electrical power unit to the work surface or the two adjacent work surfaces.

16. The electrical power unit of claim 15, wherein said at least one direct-contact electrical or data receptacle comprises an upper receptacle portion positioned in said upper housing chamber, said lower receptacle portion extends through said lower surface of said upper housing, and said wireless power transmitter is enclosed in said upper housing chamber below said upper surface.

17. The electrical power unit of claim 16, wherein said at least one direct-contact electrical or data receptacle comprises a high voltage AC power receptacle and a low voltage DC power receptacle.

18. The electrical power unit of claim 16, comprising a pair of said wireless power transmitters disposed in said upper housing chamber, and said upper housing comprising a support wall extending between said upper and lower surfaces at said perimeter region and around each of said wireless power transmitters, wherein said high voltage AC power receptacle and said low voltage DC power receptacle are positioned in a central region of said upper housing, and wherein said wireless power transmitters are positioned on opposite sides of said central region.

19. The electrical power unit of claim 15, wherein said lower housing comprises an interior surface defining said lower housing chamber, and wherein said lower housing further comprises two vertical elongate ribs spaced circumferentially apart from one another along said interior surface, each of said elongate ribs defining a vertical elongate groove, wherein said elongate grooves are directed toward one another and configured to slidably receive a circuit board associated with one of said direct-contact electrical or data receptacle or said wireless power transmitter.

20. The electrical power unit of claim 19, wherein said at least one direct-contact electrical or data receptacle comprises a low voltage DC power receptacle and an electrical converter circuit board, wherein said electrical converter circuit board is operable to receive and convert a high voltage AC power input to a low voltage DC power output to said low voltage DC power receptacle, and wherein said electrical converter circuit board comprises opposite side edges that slidably engage respective ones of said elongate ribs at said elongate grooves.

* * * * *